Nov. 10, 1964    J. A. PERRY    3,156,548
GAS CHROMATOGRAPHY APPARATUS
Filed March 21, 1960
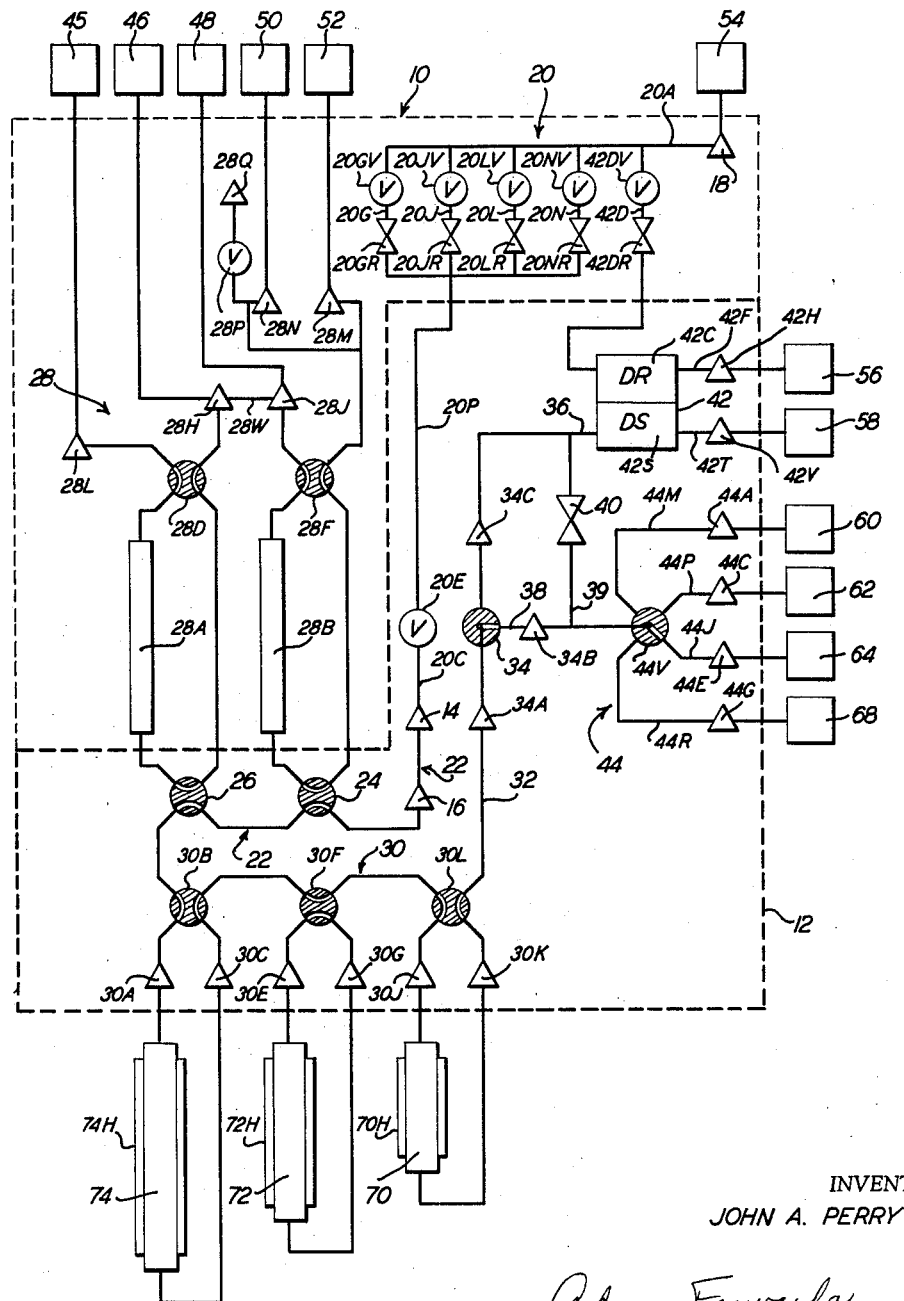
INVENTOR
JOHN A. PERRY
BY Adams Forward &
McLean
                ATTORNEYS

United States Patent Office 3,156,548
Patented Nov. 10, 1964

3,156,548
GAS CHROMATOGRAPHY APPARATUS
John A. Perry, Lansing, Ill., assignor to Sinclair Research,
Inc., a corporation of Delaware
Filed Mar. 21, 1960, Ser. No. 16,487
9 Claims. (Cl. 55—197)

This invention is a novel apparatus for gas chromatography. It comprises a chassis which supports a flow line so arranged that all parts of the flow line which carry a heated gas may be enclosed within an insulating jacket to prevent condensation in the flow line. The flow line is so arranged on the chassis that quick-connect fittings may be provided on ports opening through the chassis for the attachment to the flow line of a carrier gas supply, a liquid sample supply, and a gas sample supply as well as removable, independently heatable partitioning columns and a receiving means for the partitioned sample.

The apparatus can be constructed to be compact and portable—for example a model of the apparatus has been constructed which is only 19 inches wide, yet provides for three separating columns. The apparatus provides for greatly simplified sample introduction, even providing in some cases for introduction of a later sample while a prior sample is being run. The apparatus also provides for a detection system independent of or coordinated with the sample collection system.

The device of the invention is noteworthy for its adaptability. It can use a single separatory column or maintain a number of partition columns at the same temperatures, at different temperatures or at temperatures varying during the run. The device can be used with liquid or gas samples and is suitable for use with several different types of sample injection mechanisms. The apparatus may be used with a wide range of column sizes and shapes which are readily demountable from the chassis. The device may be used for analytical or fractionation work at any one of a variety of easily controllable flow rates, and, of course, with a variety of partition media.

Gas chromatography processes use a carrier gas to bring a mixture of gases or vaporized liquids into contact with a partition medium. The partition medium generally comprises an inert solid coated with a liquid which has varying affinities for different components in the mixture to be separated. Gas chromatography functions by the tendency of the partition medium to delay the passage of the components of the gas mixture to different extents, isolating the components into "bands" along the length of the partition medium. A highly selective partition medium can be packed into a column of minimal length and achieve separation. Less selective media require longer columns. Also, the selectivity of a particular partition medium for a particular mixture frequently varies with the temperature at which contact is made.

The partition medium performs its function generally because of differing solubilities in the liquid coating on the part of the individual constituents of the mixture; when the inert carrier gas, carrying the vaporized sample is brought into contact with the partition medium, the sample gas or vapors dissolve in the coating. The component with the least solubility and/or the highest vapor pressure spends the greatest proportion of time in the vapor phase and is, therefore, most rapidly moved along the column. The components thus emerge separately from the column in order of decreasing vapor pressures or increasing solubility.

The apparatus of this invention allows these individual constituents of the sample to be collected separately from other constituents. Also, when gas chromatography is used for analysis, this device may give a record—generally a strip of paper—on which is recorded the variation, with time, of the composition of the gas leaving the partition column. As the test samples content of each separated constituent leaves the partition column, the record shows a peak. By correlating known sample compositions with the peak heights or areas on this record, the operator may determine the proportions of constituents in the sample.

This invention provides for ready convertibility of the apparatus from gas to liquid samples, and from one set of partition column characteristics to another and from merely analyzing the sample to collection of separated constituents. Also, this invention provides a distinct advantage over prior art devices which include the partition column in the same housing with the detector, in that a temperature differential between the two, and between different columns, can be provided for in the instant invention.

The invention will be better understood by reference to the accompanying schematic drawing which shows a preferred embodiment of the invention but is not to be construed as limiting. In the schematic solid lines represent flow lines and single triangles represent ports, that is, entrances to and exits from the flow lines. In general, throughout the apparatus these ports are openings through the chassis which make flow lines mounted on one side of the chassis accessible to an operator on the other side of the chassis. Each port may physically comprise a quick-connect fitting, that is, one which gives access to the flow line as soon as an auxiliary member is plugged into it, and which seals the flow line against leaks to the outside environment when the auxiliary member is unplugged.

Also, in the schematic, shaded circles represent multi-port valves. These valves are mounted on the same side of the chassis as the flow lines and preferably are operated by a rotatable shaft which extends through the chassis to the operator on the other side.

The apparatus consists basically of a housing or chassis which may be a flat rigid sheet of metal, wood, plastic, etc., which is represented in the schematic by the dashed line 10. The various flow lines, flow controllers and self-sealing ports are mounted on the chassis in such fashion that all flow passages which conduct normally liquid materials may be enclosed in an insulating jacket. This jacket my be a generally box-like member and is shown in the drawing as the heavy dashed line 12. The chassis contains, within the insulated area a port, preferably a pair of ports 14 and 16 for the introduction of liquid samples, as well as a port 18 for the introduction of a carrier gas. These ports as explained above are preferably "quick-connect" or self-sealing fittings which contain a member responsive to gas pressure within the flow lines, or responsive to spring biasing, to close their opening. This member is pushed aside when a flow line or liquid injection apparatus is connected through the opening.

The liquid sample port 14 or 16 is connected to the carrier gas flow system 20 and to the sample passageway 22. Preferably a plurality of liquid sampling ports is provided, each port being adapted to receive a different kind of injecting device. For example, port 14 may be adapted to receive liquid from a micropipette while port 16 on the downstream side may be adapted to receive liquid from a syringe. The ports can be of known construction and accordingly have not been shown in detail.

The sample passageway 22 is located on the insulated part of the chassis and includes one or a plurality of by-pass valves 24, 26, which are connected with the gas sample system 28, and which are illustrated as by-passing the gas sample system. The sample passageway 22 leads to the partition system indicated generally as 30. The partition system is connected with an effluent line 32, which is provided with a three-port valve 34. This valve may be replaced by ports 34A, 34B and 34C suitable for connection to demountable tubing leading from the line 32 to the effluent recorder line 36 and/or the effluent collecting line 38. The valve 34, as illustrated, leads to the effluent collecting line 38. This line contains a T-joint, a leg 39, of which leads through the flow restrictor 40 to the effluent recorder line 36, which in turn leads to the recorder 42. The cross arm of effluent collecting line 38 leads to the effluent collecting system 44. This arrangement provides for a mere analysis of the injected sample when the total column effluent is directed to the line 36. When the column effluent is directed to the line 38 the major portion of the effluent travels to the collecting system 44, while only a very minor amount, sufficient merely to monitor the flow, passes to the recorder line 36.

The carrier gas flow system 20 comprises the intake line 20A leading from the port 18 and the pickup line 20C which leads past the ports 14 and 16 and at least one flow control valve 20E. This valve is provided for cutting off the carrier gas flow, if desired, during the injection of a liquid sample. The carrier gas flow system illustrated provides the operator with four independent flow rates by containing a plurality of parallel valved lines which divide the carrier gas flow and recombine it on the other side of suitable flow control mechanisms. These lines are shown in the drawing as 20G, 20J, 20L and 20N. These lines contain, respectively, the valves 20GV, 20JV, 20LV and 20NV, and the flow restrictors 20GR, 20JR, 20LR and 20NR. These parallel lines converge into the pre-pickup line 20P.

The detector 42 is preferably divided into carrier section 42C and sample section 42S. Carrier section 42C is fed a small portion of carrier gas through by-pass line 42D which leads from line 20A and which may be provided with a valve 42DV and a flow restrictor 42DR. The effluent from carrier section 42C may be removed through line 42F and port 42H. The sample section 42S, of recorder 42 is supplied by the effluent recorder line 36. Gas which has passed through this section of the recorder may be removed through line 42T and port 42V.

Gas sample system 28 provides for storage of gas samples at, below, or above atmospheric pressure and consists of one or more gas reservoirs 28A, 28B, together with means for filling one or more of the reservoirs with the same or different gas samples and means for withdrawing the gas content of the reservoirs by means of the carrier gas. The means for filling the reservoirs preferably comprises the by-pass valves 26 and 28D and 24 and 28F and the ports 28H, 28J and 28Q, which has the valve 28P, through which sample gas can be injected. Valves 24 and 26 are illustrated in the "gas by-pass" position which is used when the reservoirs are being filled.

As illustrated, these valves, as well as valves 28D and 28F which are illustrated in their "filling" position, are "straight through" by-pass valve, that is, they contain no cul-de-sacs which could trap fluids during a run, which fluids may be difficult to clean out and which may contaminate later samples. Valves 24, 26, 30B, 30F and 30L are of the same construction. When the reservoirs 28A and/or 28B have been filled to the extent desired, the valves 28D and 28F may be rotated to their by-pass position. When the reservoir contents are to be emptied into the carrier gas stream, valves 28D and 28F are maintained in their by-pass position, while valves 24 and 26 are rotated 90° to their emptying position.

The gas sample system may also be used for the chromatography of liquids. It is especially useful in a situation where a rather large volume of liquid is to be separated, as for example, in a fractionating process, or where a high gas pressure prevails in the flow line 22. In this latter instance there is danger that the injection of liquid through the port 14 or 16, by means of a glass pipette or syringe against the pressure of the carrier gas might result in breaking the injection means. The use of the gas sample system enables injection, for example into the port 28Q, with the valves 24 and 28F arranged as illustrated for by-passing the carrier gas pressure.

The gas sample system 28 may also contain other ports useable in conjunction with the gas sample system, for example a port 28L for liquid overflow from the gas sample storage system when used for liquids, a port 28M for connection to a manometer for pressure measurements, and port 28N for connection to a pump for removing gas from the system. Also, a removable flow connector 28W is provided between self-sealing ports 28H and 28J for operation of both reservoirs as one unit. Reservoirs 28A and 28B are constructed so as to be readily removable and may be of greatly differing capacities ranging, for example, from 2 to 500 ml. in volume. The difference in capacity would be especially desirable for accommodating wide variations in gas and liquid volumes charged to and temporarily stored in the apparatus. It will also be observed that the reservoirs 28A and 28B may discharge liquid samples to the carrier gas flow lines by simple gravity dispensing.

Partition system 30 comprises essentially at least one pair of ports 30A and 30C which are suitable each to be connected to an end of a partition column. One of these ports is connected to the sample passageway 22 and the other port is connected to the effluent line 32. Preferably the partition system comprises a plurality of pairs of ports, as 30E–30G, 30J–30K, and with a by-pass valve for each pair of ports, shown in the drawing as 30B, 30F and 30L. These valves also are preferably "straight through" valves of the type described above. The pairs of ports can provide connections to one chromatographic partition column for each pair of ports and even while attached to the chassis, any of the partition columns may be by-passed.

The effluent system 44 may comprise merely a port suitable for connection with any selected gas collecting vessel, which vessel may be replaced each time a new constituent of the sample is about to come out from the apparatus. Preferably, however, an arrangement such as is illustrated is made which provides a plurality of ports 44A, 44C, 44E, 44G, each suitable for connection with a receiving vessel. Flow from the effluent line 38 is directed to any selected one of these ports by means of the valve 44V, which is illustrated as leading to the port 44E through the line 44J. Lines 44M, 44P and 44R are also provided leading from the valve 44V to ports 44A, 44C, and 44G respectively. A by-pass line between effluent line 38 and sample detector line 36 is provided with flow restrictor 40 to enable the flow of each constituent through the line 38 and the valve 44V to be monitored by the sample section 42S of the detector 42.

Since portability is an important feature of the apparatus of the invention, the provision of quick-connect fittings enables the basic instrument package to be of a small manageable size and yet allows the more bulky auxiliary equipment to be readily attached to the flow lines. Such auxiliary equipment may comprise a sample gas overflow vessel 45, one or more sample gas storage vessels 46, 48, a vacuum pump 50, a manometer 52, a storage vessel 54 for carrier gas, a used carrier gas receptacle 56, a sample receptacle 58, constituent receptacles 60, 62, 64, 68, and partition columns 70, 72 and 74, each piece of auxiliary equipment being provided with the necessary leads for connection to a suitable port. It is to be understood, of course, that any of these auxiliary elements may be included as features permanently installed on the chassis, in which case the quick-connect fitting for a port will give way to a simple permanent joint between the auxiliary equipment line and the line to the port.

The elements of the novel device of the invention may be arranged for optimum convenience by providing access to each of the ports (illustrated as single triangles in the schematic) on one side, for example, in front of the chassis. An operator for each valve may also be provided on the same side. The flow lines, detector and other elements to be enclosed in the insulating jacket are conveniently mounted on the other side of the chassis, with the jacket covering the section of the back of the chassis whereon these elements are mounted.

Also, it is to be understood that the gas sample system 28 and the carrier gas system 20 need not be permanently installed on the chassis but may also be considered in the realm of auxiliary equipment. In such a situation valve 20E may, for example, be replaced by a self-sealing port upstream of 14 for the introduction of carrier gas. A removable gas sample system could be connected to the flow line by pairs of self-sealing ports, one of each pair on either side of valves 24 and 26 respectively. These ports could be placed directly in the flowline 22, or beyond the valves 24 and 26 in the gas sample system illustrated.

The arrangement of the partition columns as readily removable provides a high degree of flexibility in choosing partition medium characteristics. One column or set of columns may easily be replaced by other columns in any desired length, and containing any desired partition medium. Also, as illustrated, each column may be provided with its own individual heating element, 70H, 72H, 74H to provide columns having temperatures differing from each other or having temperature gradients along the column or in time as well as differing from the temperature of the flow line contained within the insulating jacket 12.

The by-pass valves in the schematic are shown in position for filling the gas sample reservoirs and for conducting a separation on a sample of mixed liquids. The flow is as follows:

Carrier gas, for example, from the storage vessel 54, enters through the port 18 and is conducted from a carrier gas influent line 20A through one or more of the lines 20G, 20J, 20L, 20N, to the valve 20E which is opened to permit flow. Part of the carrier gas is by-passed through the line 42D to serve as a standard or blank in the detector 42. The carrier gas enters the carrier section 42C of the detector and is conducted to the port 42H whence it may be removed from the system, being conducted perhaps into the receptacle 56. A liquid sample is injected into one of the ports 14 or 16 and is taken up by the carrier gas in the sample line 22 which conducts it through valves 24 and 26 and through valve 30B to the port 30A. It will be noted that the sample is within the jacketed portion of the apparatus from the time it is injected at 14 or 16 until it leaves at 30A. The temperature within the jacket is maintained sufficiently high, for example, by heating elements within the jacket (not shown), to prevent condensation of the liquid in the flow lines.

The mixture of sample and carrier gas is conducted in the illustration through heated partition column 74, valve 30F (by-passing column 72) and to and through heated column 70 by means of valve 30L and port 30J. After the column 70 is traversed, the carrier gas, carrying the components of the sample individually, passes once more into the chassis mounted flow line by means of the port 30K.

The gas is conducted by valve 30L and line 32 to valve 34 and thence to line 38. At the T in line 38 the flow of gas is divided, a small stream for monitoring purposes being sent through flow restrictor 40 to line 36 and thence to the sample section 42S of detector 42 and to port 42V where this gas portion may be received into sample collector 58. The major proportion of gas in line 38 is conducted to valve 44V and line 44J to constituent exit port 44E where it may suitably be received into collection receptacle 64. This sample of substantially pure liquid may then be used for whatever purpose is desired. When other substances are being brought through line 32 by the carrier gas, the flow is diverted by valve 44V to other ports and receptacles 44A, 44C, 44G, 60, 62 and 68.

Simultaneously with the liquid separation, a gas mixture, or another liquid mixture to be partitioned at a later time may be introduced into one or more of the reservoirs 28A, 28B with valves 24 and 26 in the by-pass positions shown in the schematic. With removable tube 28W in place, both reservoirs may be filled from either port 28H or 28J from a suitable source of supply such as storage tanks 46 or 48, or from port 28Q, valves 28D and 28F being positioned as shown in the drawing. If line 28W is removed either reservoir may be filled individually. Excess gas or liquid may be drawn off from reservoir 28A through overflow port 28L; the same may be done for reservoir 28B from the port 28N, or either of these ports may be used to evacuate gas from the entire system 28 or, by opening one or more of the valves 24 and 26, gas may be evacuated from the entire apparatus.

When a gas is to be partitioned, valves 24, 26, 28D and 28F are turned to direct carrier gas through both reservoirs, or, alternatively only 24 and 28F may be turned to sample the gas in reservoir 28B, or only 26 and 28D may be turned to direct flow through reservoir 28A.

In using the apparatus it is also possible, when none of the sample introduction means described is suitable as for example, when a very large supply of liquid or gas is to be fractionated and it is not feasible to replace reservoirs 28A and 28B with larger vessels, to attach any vessel at all to the connections 30A and 30C, wrap the vessel with a heating tape, if necessary for vaporizing a liquid sample, and provide partitioning columns 72 and 70 of a size sufficient for the separation desired.

The following specific examples of partitioning procedures using a preferred embodiment of this invention are not to be construed as limiting.

*Example 1*

A gas chromatographic fractionation was proposed as a substitute for spinning band micro distillation of a sample comprising a series of even-carbon-numbered alkenes plus normal heptane. The cuts were to undergo infrared analysis.

The gas chromatographic fractionation was to yield cuts with a minimum volume of 0.1 ml. amounting to as little as 1% of the total sample. The fractionation was to be completed within an hour. The cuts, once obtained, would then require no special microtechniques for infrared analysis; and the fractionation would be about ten times faster than spinning-band distillation. The fractionation of the $C_4$–$C_{10}$ sample, necessarily 10 ml. in size (1% of 10 ml.=0.1 ml.), was accomplished by suitable choice of column and of operating procedures.

Three columns, the first three feet long, the second nine feet long, and the third eighteen feet long, were packed with 20 weight percent Dow Corning Silicone High Vacuum Grease deposited from a benzene supension onto a 30–60 mesh inert solid carrier. A separate heater winding was applied to each column.

Preliminary studies established the times of passage of constituents through the columns. With this information, the following operating procedures were developed. The sample was syringe-injected into the inlet line heated to 140° C. and carried by nitrogen into all columns, with the first column at 135° C., the second at 80° C., and the third at 25° C. Flow rate through all columns in series was 960 ml. $N_2$/min. Application of successive prescribed changes in flow direction and column temperature were indicated by returns of the recorder pen to the base line, showing successive completions of fraction collection. The pattern of changes is given in the following table.

| Event | Minutes Elapsed | Columns in Use | | | Temperatures, ° C. | | |
|---|---|---|---|---|---|---|---|
| | | 1st | 2nd | 3rd | 1st | 2nd | 3rd |
| Inject sample | 0 | x | x | x | 135 | 80 | Room |
| After $C_4$ collection | 5 | x | x | x | 135 | 80 | 35 |
| Remove Columns 1, 2, from use | 18 | | | x | | | 35 |
| After $C_6$ collection | 20 | | | x | | | 60 |
| After $C_7$ collection | 35 | | | x | | | 120 |
| After $C_8$ collection | 50 | x | x | | 135 | 135 | |

The sharp returns to the base line showed clearly that a fraction had been collected and that the next change of conditions was in order. The cuts from the many samples fractionated, at one hour per sample, were large enough to require no special skill in handling and were not detectably contaminated by neighboring cuts. They were, however, occasionally contaminated by traces of the silicone stationary phase but not badly enough to interfere with the infrared analysis.

In this application, preparative gas chromatography was faster, more reliable, and more efficient than alternative methods of separation. Because the method was easy and fast, samples rarely required refractionation. Finally, the relatively low temperatures of the gas chromatographic approach help protect possible labile components such as were at hand.

*Example II*

A successful and useful application of the present instrument was the separation of three $C_8$ isomeric chlorides. Infrared examination of the separated isomers would allow correlation of a given chromatographic peak with a given isomer. Distillation had failed to make the separation. Attempts with a commercial instrument to conduct a preparative gas chromatographic separation with ordinary microliter samples had repeatedly failed either to make a complete separation or to yield enough material to be usable by the infrared laboratory. What had been prepared was inexplicably and grossly contaminated. The results from the successful macroscale separation to be described explained this contamination.

The separation of a 2.5 ml. sample was accomplished by proper choice of column, stationary phase, and operation procedure. Three separately and variably heated 16 foot by ½″ O.D. columns were packed with 30 weight percent $\beta,\beta'$-iminodipropionitrile on 30–60 mesh inert solid carrier. The columns were used in series. The temperature of the first column was 105° C.; of the second, 75° C.; and of the third, 40° C. These temperatures were constant during the fractionation.

The nitrogen carrier gas flow was 590 ml./min., of which 25 ml./min. (about 4%) was passed through the detector. The fractionation took about 2½ hours.

Infrared spectroscopic examination of the collected fractions showed complete separation of the isomers. Although each fraction contained a detectable but negligible trace of the stationary phase, this could, if necessary, have been removed by vacuum transfer of the isomer. The identification of the isomers with the corresponding chromatographic peaks was immediate.

Analytical gas chromatographic examination of the fractions (60 feet of 5 weight percent $\beta,\beta'$-iminodipropio- nitrile in a ¼″ O.D. column at 132° C.; 60 ml. He/min.) showed a trace contaminant in increasing amounts in the successively collected fractions. Although the $\beta,\beta'$-iminodipropionitrile obviously could separate the contaminant from each isomer, the contaminant was present in each separated isomer in an amount proportional to residence time in the columns. The contaminant must, therefore, have been a product of thermal degradation taking place not in the vapor transfer lines but in the columns. Some of the contamination of the earlier microscale work is thus partially explained.

I claim:

1. An apparatus suitable for use in gas chromatography and which may be provided with a source of carrier gas, a source of fluid sample, partitioning means and effluent collection means which comprises a chassis having a front side and a back side, which chassis supports
   (I) Inlets for
      (A) a carrier gas
      (B) a liquid sample and
      (C) a gas sample
   (II) A carrier gas flow line having flow control means which connects said carrier gas inlet with said sample inlets,
   (III) Connections to
      (A) partitioning means comprising an inlet to said means and an outlet from said means and
      (B) effluent collection means
   (IV) A sample passageway leading, by way of flow control means, from said sample inlets to said partitioning means inlet,
   (V) An effluent line leading, by way of flow control means, from said partition means outlet to said effluent collection means, and
   (VI) On its back side an insulating jacket which encloses said carrier gas flow line, said sample passageway and said effluent line,
said inlets (I) and connections (III) being accessible on the front side of the chassis.

2. The apparatus of claim 1 in which the gas sample inlet is provided with a gas sample supply system comprising
   (a) a reservoir for gas sample, and
   (b) a multi-way valve between the reservoir and the gas sample inlet suitable for alternatively
      (i) by-passing the gas sample reservoir, and
      (ii) connecting the gas sample reservoir to the gas sample inlet.

3. The apparatus of claim 2 in which the said gas sample supply system comprises
   (a') a plurality of reservoirs for gas samples, and
   (b') a multi-way valve of the said suitability between each said reservoir and the gas sample inlet.

4. The apparatus of claim 1 in which said carrier gas flow line (II) is connected to said carrier gas inlet by a plurality of valved lines arranged for parallel flow of carrier gas.

5. The apparatus of claim 1 in which the connection to partitioning means includes a valve which allows by-passing of said connection.

6. The apparatus of claim 5 in which the connection to partitioning means includes a plurality of valves allowing connection to and by-passing of a plurality of partitioning means.

7. The apparatus of claim 1 in which said effluent line (V) includes
   (A) a multi-way valve, and
   (B) a plurality of lines each leading from the valve to a connection for effluent collecting means.

8. The apparatus of claim 1 in which the chassis also supports
   (VII) A detector system enclosed by said jacket comprising
      A. a recorder for carrier gas connected by a carrier gas by-pass line to the carrier gas inlet and B. a recorder for effluent gas connected to said effluent line (V) between said partition means connection and said effluent collection means connection.

9. An apparatus suitable for use in gas chromatography and which may be provided with a source of carrier gas, a source of fluid sample, partitioning means and effluent collection means which comprises a chassis having a front side and a back side, which chassis supports:
(I) Inlets for
    A. a carrier gas
    B. a liquid sample, and
    C. a gas sample, said gas sample inlet being provided with a gas sample supply system comprising
        (a) a reservoir for gas sample, and
        (b) a multi-way valve between the reservoir and the gas sample inlet suitable for alternatively
            (i) by-passing the gas sample reservoir,
            (ii) connecting the gas sample reservoir to the gas sample inlet.
(II) A carrier gas flow line connected to said carrier gas inlet by a plurality of valved lines arranged for parallel flow of carrier gas, and connected by flow control means to said sample inlets;
(III) Connections to
    A. partitioning means including a plurality of valves allowing connection to inlets to said means and outlets from said means and by-passing of a plurality of partitioning means, and
    B. effluent collection means;
(IV) A sample passageway leading, by way of flow control means, from said sample inlets to said partitioning means inlet;
(V) An effluent line leading from said partitioning means outlet to
    (A) a multi-way valve and, downstream of said multi-way valve, to
    (B) a plurality of lines each leading from the said multiway valve to a connection for effluent receiving means;
(VI) An insulating jacket on the back side of the chassis which encloses said carrier gas flow line, said sample passageway and said effluent line; and
(VIII) A detector system enclosed by said jacket comprising
    (A) a recorder for carrier gas connected by a carrier gas by-pass line to the carrier gas inlet and
    (B) a recorder for effluent gas connected to said effluent line between said partition means connection and said effluent collection means connection said inlets (I) and connections (III) being accessible on the front side of the chassis.

References Cited in the file of this patent

UNITED STATES PATENTS

| | | |
|---|---|---|
| 2,826,908 | Skarstrom | Mar. 18, 1958 |
| 2,841,005 | Coggeshal | July 1, 1958 |
| 2,868,011 | Coggeshal | Jan. 13, 1959 |
| 2,920,478 | Golay | Jan. 12, 1960 |
| 2,964,938 | Fuller | Dec. 20, 1960 |
| 2,981,092 | Marks | Apr. 25, 1961 |
| 2,982,123 | Kindred | May 2, 1961 |
| 3,097,517 | Bowen et al. | July 16, 1963 |

FOREIGN PATENTS

| | | |
|---|---|---|
| 812,538 | Great Britain | Apr. 29, 1959 |